United States Patent
Olson et al.

(10) Patent No.: US 11,568,055 B2
(45) Date of Patent: Jan. 31, 2023

(54) SYSTEM AND METHOD FOR AUTOMATICALLY DETECTING A SECURITY VULNERABILITY IN A SOURCE CODE USING A MACHINE LEARNING MODEL

(71) Applicant: Praetorian, Austin, TX (US)

(72) Inventors: Jeff Olson, Austin, TX (US); Matthew Kindy, II, Austin, TX (US)

(73) Assignee: Praetorian, Austin, TX (US)

( * ) Notice: Subject to any disclaimer, the term of this patent is extended or adjusted under 35 U.S.C. 154(b) by 610 days.

(21) Appl. No.: 16/549,019

(22) Filed: Aug. 23, 2019

(65) Prior Publication Data

US 2021/0056211 A1    Feb. 25, 2021

(51) Int. Cl.
    *G06F 21/57*     (2013.01)
    *G06F 16/901*    (2019.01)
    *G06N 20/00*     (2019.01)

(52) U.S. Cl.
    CPC ........ *G06F 21/577* (2013.01); *G06F 16/9024* (2019.01); *G06F 16/9027* (2019.01); *G06N 20/00* (2019.01)

(58) Field of Classification Search
    CPC .............. G06F 21/577; G06F 16/9027; G06F 16/9024; G06N 20/00
    See application file for complete search history.

(56) References Cited

U.S. PATENT DOCUMENTS

2017/0255544 A1    9/2017  Plate et al.
2019/0138731 A1*   5/2019  Tan ..................... G06F 11/3608

(Continued)

FOREIGN PATENT DOCUMENTS

CN         110232280 A        9/2019

OTHER PUBLICATIONS

Alon et al. "CODF2SEQ: Generating Sequences From Structured Representations of Code" Cornell University Library, 2018, Published as a conference paper at ICLR 2019, 11 pages.

(Continued)

*Primary Examiner* — Matthew Smithers
*Assistant Examiner* — Shu Chun Gao
(74) *Attorney, Agent, or Firm* — Ziegler IP Law Group, LLC (57) ABSTRACT

A method for (of) automatically detecting a security vulnerability in a source code using a machine learning model, characterized in that the method includes: obtaining the source code from a client codebase, wherein the client codebase is a complete or an incomplete body of the source code for a given software program or an application; and using a machine learning (ML) model to perform a ML based analysis on an abstract syntax tree (AST) for detecting a first security vulnerability over a static source code, the machine learning based analysis comprise (i) flattening the abstract syntax tree (AST) into a sequence of structured tokens, wherein the sequence of structured tokens includes a semantic structure and a syntactic structure of the source code, (ii) implementing a natural language processing technique on the sequence of structured tokens for mapping the sequence of structured tokens to one or more integers, (iii) pre-training the machine learning model using an unlabeled source code as an input to predict a subsequent sub-token in the sequence of structured tokens and (iv) training the machine learning model on a labeled source code to predict a presence or an absence of the first security vulnerability.

28 Claims, 4 Drawing Sheets

(56) References Cited

U.S. PATENT DOCUMENTS

2021/0035556 A1* 2/2021 Shen ................... G06K 9/6256
2021/0049443 A1* 2/2021 Klaiman ................. G06N 3/04

OTHER PUBLICATIONS

GB Intellectual Property Office, Examination Report and Notification of Intention to Grant under Section 18(4), dated Oct. 1, 2021, 2 pages.
GB Intellectual Property Office, Search Report under Section 17(5), Application No. GB1917161.0, dated Aug. 4, 2020, 4 pages.
Harer et al. "Tree-Transformer: A Transformer-Based Method for Correction of Tree-Structured Data" Cornell University Library Aug. 1, 2019, arXiv:1908.00449v1 [cs.LG], 13 pages.

\* cited by examiner

SYSTEM AND METHOD FOR AUTOMATICALLY DETECTING A SECURITY VULNERABILITY IN A SOURCE CODE USING A MACHINE LEARNING MODEL

TECHNICAL FIELD

The present disclosure relates generally to a system and a method for automatically detecting a security vulnerability in a source code using a machine learning model; moreover, the aforesaid system employs, when in operation, machine learning techniques that detects security vulnerability in the source code, for example by way of performing, using the machine learning model, a post-analysis on a first security vulnerability, a second security vulnerability, and a third security vulnerability to predict a final security vulnerability.

BACKGROUND

In computer security, a vulnerability is a weakness which can be exploited by a threat actor, such as an attacker, to perform unauthorized actions within a computer system. To exploit a vulnerability, an attacker must have at least one applicable tool or technique that can connect to a system weakness. Vulnerability management is the cyclical practice of identifying, classifying, remediating, and mitigating vulnerabilities. This practice generally refers to software vulnerabilities in computing systems.

A software vulnerability discovery through automated code inspection has continued to remain elusive. According to Rice's theorem, all non-trivial, semantic properties of programs are undecidable. The software vulnerability discovery using an automated process is inaccurate as a computer program may identify semantic properties of another computer program that is running on the computing system. The semantic property is one about the program's behaviour, for instance, does the program terminate for all inputs. Unlike, a syntactic property, for instance, does the program contain an if-then-else statement. A property is non-trivial if it is neither true for every computable function, nor false for every computable function.

Most of the existing software vulnerability static analysis techniques are not precise, complete, and scalable. One such method of software analysis using taint analysis to identify sources, sanitizers has a propensity for high false positives and false negatives due to the complexity of syntactic structure and the complexity of semantic interpretation which needs to accurately identify security vulnerabilities in a source code. Other existing solutions that attempt to perform automated code analysis (e.g. a traditional static analysis) have high signal-to-noise ratios with respect to a high number of false positives that they are reporting (i.e. reported vulnerabilities that don't exist) and/or a high number of false negatives (i.e. unreported vulnerabilities that do exist).

U.S. Pat. No. 8,806,619 discloses a system and method of determining whether software includes malicious code. The method includes instrumenting a validation machine with tools and monitors that capture the static and dynamic behavior of software. Software under examination is executed on the validation machine, and the tools and monitors are used to log data representative of the behavior of the software to detect vulnerable or malicious code. If possible, one or more operations are automatically performed on the software to enhance the security of the software by neutralizing the vulnerable or malicious code. Activities that cannot be neutralized automatically are flagged for human inspection.

U.S. Pat. No. 8,499,353 discloses a security assessment platform. The platform includes a communications server for receiving technical characteristics and business-context information relating to a software application and testing engines for performing a plurality of vulnerability tests thereon. The platform may also include a testing workflow module for defining an assurance level for the application based on the technical characteristics and business-context information, defining a vulnerability test plan that includes multiple vulnerability tests based on the assurance level, and correlating the results of vulnerability tests to identify related faults in the application. However, none of the above prior art effectively detect the vulnerability in the source code while keeping signal-to-noise ratios as low.

Therefore, in light of the foregoing discussion, there exists a need to overcome the aforementioned drawbacks in existing approaches for automatically detecting the security vulnerability in the source code without false positives and false negatives while keeping the signal-to-noise ratios as low.

SUMMARY

The present disclosure seeks to provide a method for (of) automatically detecting a security vulnerability in a source code using a machine learning model.

According to a first aspect, the present disclosure provides a method for (of) automatically detecting a security vulnerability in a source code using a machine learning model, characterized in that the method comprising:
  obtaining the source code from a client codebase, wherein the client codebase is a complete or an incomplete body of the source code for a given software program or an application; and
  using a machine learning (ML) model to perform a ML based analysis on an abstract syntax tree (AST) for detecting a first security vulnerability over a static source code, the machine learning based analysis comprising:
    flattening the abstract syntax tree (AST) into a sequence of structured tokens, wherein the sequence of structured tokens comprises a semantic structure and a syntactic structure of the source code,
    implementing a natural language processing technique on the sequence of structured tokens for mapping the sequence of structured tokens to one or more integers,
    pre-training the machine learning model using an unlabeled source code as an input to predict a subsequent sub-token in the sequence of structured tokens, and
    training the machine learning model on a labeled source code to predict a presence or an absence of the first security vulnerability.

The present disclosure is of advantage in that improved signal-to-noise ratio through the combination of techniques and, in particular, the use of machine learning (ML) model can assist to improve security vulnerability detection in the source code.

Optionally, the method comprises detecting a second security vulnerability before compilation of the source code by performing a static analysis on a vectorized call graph.

Optionally, the method comprises detecting a third security vulnerability during the compilation of the source code by performing a library analysis on the vectorized call graph.

Optionally, the method comprises performing, using the machine learning model, a post-analysis on the first security vulnerability, the second security vulnerability, and the third security vulnerability to predict a final security vulnerability.

Optionally, the method comprises generating a database with the source code and its associated metadata, wherein the source code comprises the unlabeled source code and the labeled source code.

Optionally, the method comprises parsing the source code into the abstract syntax tree (AST), wherein the abstract syntax tree (AST) is a tree representation of an abstract syntactic structure of the source code written in a programming language.

Optionally, the method comprises generating a call graph by integrating the abstract syntax tree (AST) with a control and a dataflow of the source code, wherein the call graph represents calling relationships between subroutines in a computer program.

Optionally, the method comprises implementing an embedded technique on the call graph to generate the vectorized call graph.

Optionally, the method comprises providing the final security vulnerability on an expert device for receiving a first input from a security expert.

Optionally, the method comprises processing the first input on the final security vulnerability, wherein the first input comprises a feedback associated with the final security vulnerability.

Optionally, the method comprises providing the first input on the final security vulnerability as training data to train the machine learning model and to improve an accuracy of the prediction of a presence of vulnerabilities within the source code.

Optionally, the method comprises providing the final security vulnerability to a user on a user device.

Optionally, in the method, the natural language processing comprises a Byte Pair Encoding (BPE).

Optionally, in the method, the source code comprises at least one of a method, a class, a package or variable names along with comments and string literals.

Optionally, in the method, the library analysis is performed using a software component analysis tool.

According to a second aspect, there is provided a system for (of) automatically detecting a security vulnerability in a source code using a machine learning model, characterized in that the system comprising:
one or more processors;
one or more non-transitory computer-readable mediums storing one or more sequences of instructions, which when executed by the one or more processors, cause:
obtaining the source code from a client codebase, wherein the client codebase is a complete or an incomplete body of the source code for a given software program or an application; and
using a machine learning (ML) model to perform a ML based analysis on an abstract syntax tree (AST) for detecting a first security vulnerability over a static source code, the machine learning based analysis comprising:
flattening the abstract syntax tree (AST) into a sequence of structured tokens, wherein the sequence of structured tokens comprises a semantic structure and a syntactic structure of the source code,
implementing a natural language processing technique on the sequence of structured tokens for mapping the sequence of structured tokens to one or more integers,
pre-training the machine learning model using an unlabeled source code as an input to predict a subsequent sub-token in the sequence of structured tokens, and
training the machine learning model on a labeled source code to predict a presence or an absence of the first security vulnerability.

Optionally, in the system, the one or more processors is configured to detect a second security vulnerability before compilation of the source code by performing a static analysis on a vectorized call graph.

Optionally, in the system, the one or more processors is configured to detect a third security vulnerability during the compilation of the source code by performing a library analysis on the vectorized call graph.

Optionally, in the system, the one or more processors is configured to perform, using the machine learning model, a post-analysis on the first security vulnerability, the second security vulnerability, and the third security vulnerability to predict a final security vulnerability.

Optionally, in the system, the one or more processors is configured to generate a database with the source code and its associated metadata, wherein the source code comprises the unlabeled source code and the labeled source code.

Optionally, in the system, the one or more processors is configured to parse the source code into the abstract syntax tree (AST), wherein the abstract syntax tree (AST) is a tree representation of an abstract syntactic structure of the source code written in a programming language.

Optionally, in the system, the one or more processors is configured to generate a call graph by integrating the abstract syntax tree (AST) with a control and a dataflow of the source code, wherein the call graph represents calling relationships between subroutines in a computer program.

Optionally, in the system, the one or more processors is configured to implement an embedded technique on the call graph to generate the vectorized call graph.

Optionally, in the system, the one or more processors is configured to provide the final security vulnerability on an expert device for receiving a first input from a security expert.

Optionally, in the system, the one or more processors is configured to process the first input on the final security vulnerability, wherein the first input comprises a feedback associated with the final security vulnerability.

Optionally, in the system, the one or more processors is configured to provide the first input on the final security vulnerability as training data to train the machine learning model and to improve an accuracy of the prediction of a presence of vulnerabilities within the source code.

The present disclosure also provides a computer program product comprising instructions to cause the system to carry out the above-described method.

Embodiments of the present disclosure substantially eliminate or at least partially address the aforementioned drawbacks in existing approaches for automatically detecting the security vulnerability in the source code without false positives and false negatives while keeping the signal-to-noise ratios as low.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

The present disclosure provides a method for (of) automatically detecting a security vulnerability in a source code using a machine learning model, characterized in that the method comprising:
obtaining the source code from a client codebase, wherein the client codebase is a complete or an incomplete body of the source code for a given software program or an application; and
using a machine learning (ML) model to perform a ML based analysis on an abstract syntax tree (AST) for detecting a first security vulnerability over a static source code, the machine learning based analysis comprising:
flattening the abstract syntax tree (AST) into a sequence of structured tokens, wherein the sequence of structured tokens comprises a semantic structure and a syntactic structure of the source code,
implementing a natural language processing technique on the sequence of structured tokens for mapping the sequence of structured tokens to one or more integers,
pre-training the machine learning model using an unlabeled source code as an input to predict a subsequent sub-token in the sequence of structured tokens, and
training the machine learning model on a labeled source code to predict a presence or an absence of the first security vulnerability.

The present method is of advantage in that improved signal-to-noise ratio through the combination of above analysis and, in particular, the use of machine learning (ML) model can assist to improve security vulnerability detection in the source code.

The present method thus automates the detection of a security vulnerability in the source code using a combination of static analysis and component analysis techniques (i.e. library analysis) coupled with the machine learning model. The present method thus enables a complete scan of a computer program to automatically identify any potential security vulnerability and classify it. The present method optionally provides the detected security vulnerability for review or verification by a human security expert. The present method optionally detects security vulnerabilities at a speed comparable to a speed at which the source code is written and deployed. The present method optionally enables differential analysis of new code changes and their security impact.

It will be appreciated that the aforesaid present method is not merely a "method of doing a mental act", but has a technical effect in that the method functions as a form of automatic detection of software vulnerabilities using the machine learning model based analysis, the statistical analysis, and the library analysis of the source code. The method involves performing training, using the machine learning model, on a labeled source code to predict a presence or an absence of the first security vulnerability.

The present method processes and analyses the source code for assisting a security expert in analyzing the source code and for reporting the security vulnerabilities to a user. The present method employs a combination of machine learning (ML) techniques, static analysis (SA), and library analysis (e.g. Software Composition Analysis) for continuously and automatically detecting the security vulnerability in the source code.

The present method optionally provides an option for the security expert to provide feedback to the machine learning model for improving an accuracy of predictions and to improve a performance of the machine learning model on subsequent evaluations. The present method optionally classifies the detected security vulnerabilities into risk profiles, vulnerability classes by language and a vulnerability type as recognized by an open web application security project (OWASP) and other security organizations for better understanding by the user.

The machine learning (ML) model optionally manages integration with client codebases and securely stores the source code and associated metadata. The machine learning model optionally parses, processes, and transforms the source code into a format suitable (e.g. vectorization format)

for the ML model to interpret the source code. The machine learning model optionally feeds data to and interpret results (i.e. security vulnerability) from the ML model. The machine learning model optionally runs SCA tools over client libraries and reports potential security vulnerability to a human security expert. The machine learning model optionally reports verified security vulnerability to the user.

In an embodiment, before the ML model is executed on the source code, the source code is transformed into a suitable format (i.e. a vectorization format). The ML model optionally parses the source code into abstract syntax trees (ASTs) first and then processes, links, and normalizes the abstract syntax trees.

The ML model optionally employs a processing technique to flatten the ASTs into a sequence of structured tokens. The sequence of structured tokens optionally captures semantic and syntactic structure of the original source code. In order to feed into the ML model, the sequence of structured tokens is mapped to integers. The sequence of structured tokens is optionally mapped to integers by employing a natural language processing (NLP) technique. The natural language processing (NLP) technique optionally comprises a Byte Pair Encoding (BPE). The Byte Pair Encoding (BPE) optionally handles the unlimited vocabulary of the source code while at the same time treats common tokens and sub-tokens as logical units.

The machine learning model optionally comprises a deep neural network architecture, which is used in the nature language processing, called a transformer or a self-attention network. More specifically, the machine learning model uses a same decoder-only variant of the transformer used in with a masked, multi-head, self-attention mechanism which optionally consists of a word or a token embedding layer followed by a sequence of one or more transformer blocks. Final layers of the machine learning model optionally depend on a task being learned.

The machine learning model is optionally trained in two phases. In first phase, the machine learning model is optionally pre-trained on a large corpus of unlabeled source code along with a task of predicting the next sub-token in a random initial subsequence of a training example. The first/pre-training phase is unsupervised which allows the machine learning model to learn a deep, distributed representation of function-level ASTs along with a learned embedding of AST tokens. The second phase of training is to calibrate weights of the machine learning model in order to predict a presence or an absence of a specific security vulnerability in the source code. The second phase of training the machine learning model is a supervised phase which relies on labels manually added to the training examples.

Detection for security vulnerabilities in source code using the machine learning model has several distinct advantages over traditional static analysis. For example, the machine learning model utilizes the advantages of the natural language aspects of the source code that are invisible to static analysis tools. Every aspect of the source code (e.g. a method, a class, a package, and a variable name along with comments and string literals) is infused with names and language that are meant to confer meaning and intention to programmers. The natural language aspects are optionally leveraged to develop an intelligent static analysis tool. By analyzing and learning a statistical model of the natural language aspects of the source code, the machine learning model is able to generalize to patterns and APIs not seen during training or not known/built-in to the static analysis tool. The machine learning model optionally uses these features and the natural language aspects to detect and assign more emphasis to examples that are similar to true vulnerabilities, in the same way, which human intuition does.

According to an embodiment, the method comprises detecting a second security vulnerability before compilation of the source code by performing a static analysis on a vectorized call graph.

In an embodiment, the static analysis is a technique for finding bugs and security vulnerabilities in a computer program but it usually suffers from either a very low recall (i.e. true positive rate) or a high false discovery rate (for example many false positives) due to complexity of the security vulnerabilities and necessary algorithms that are mechanically found by the static analysis. The machine learning model optionally improves by learning and exploiting statistical patterns in the source code in a way that is hard to code algorithmically.

In an embodiment, the static analysis is performed by the static analysis tool. The static analysis tool optionally comprises an open source static security analysis tool. The static analysis tool scans the source code and then statically analyses the scanned source code for lexical patterns to detect the second security vulnerability with a low signal-noise ratio. The static analysis may optionally employ the machine learning model to increase the signal-noise ratio. The lexical patterns optionally built from lexical items of the vectorized call graph.

According to another embodiment, the method comprises detecting a third security vulnerability during the compilation of the source code by performing a library analysis on the vectorized call graph.

In an embodiment, the library analysis is a kind of dynamic analysis to detect the security vulnerability during the compilation of the source code based on the vectorized call graph. The library analysis is performed using a software component analysis tool.

The Software Composition Analysis (SCA) optionally employs a set of tools that provides a user visibility into the source code. The SCA optionally identifies third-party and open source components that have been integrated into the source code. For each of these components, the SCA optionally identifies any open security common vulnerabilities and exposures (CVEs), licenses, and out-of-date library versions.

The software component analysis tool optionally links an open source library and libraries with known security vulnerabilities into a common vulnerabilities and exposures (CVEs) database. The software component analysis tool scans the source code to find libraries used by the customers. The libraries contain known vulnerabilities to detect the third security vulnerability with low signal-noise ratio. The software component analysis tool may optionally employ the machine learning model to increase the signal-noise ratio. In an embodiment, the labeled source code in a programming language optionally includes a sequence of characters that identifies a location within the source code.

According to yet another embodiment, the method comprises performing, using the machine learning model, a post-analysis on the first security vulnerability, the second security vulnerability, and the third security vulnerability to predict a final security vulnerability.

According to yet another embodiment, the method comprises providing the final security vulnerability on an expert device for receiving a first input from a security expert. In an embodiment, the final security vulnerability is provided on the expert device for receiving a verification input from the security expert. The final security vulnerability is optionally provided on a user interface of the expert device for receiving the first input. The expert device optionally comprises a personal computer, a mobile phone, a laptop, a Smartphone or an electronic notebook.

According to yet another embodiment, the method comprises generating a database with the source code and its associated metadata, wherein the source code comprises the unlabeled source code and the labeled source code.

According to yet another embodiment, the method comprises parsing the source code into the abstract syntax tree (AST), wherein the abstract syntax tree (AST) is a tree representation of an abstract syntactic structure of the source code written in a programming language.

According to yet another embodiment, the method comprises generating a call graph by integrating the abstract syntax tree (AST) with a control and a dataflow of the source code, wherein the call graph represents calling relationships between subroutines in a computer program.

According to yet another embodiment, the method comprises implementing an embedded technique on the call graph to generate the vectorized call graph.

According to yet another embodiment, the method comprises processing the first input on the final security vulnerability, wherein the first input comprises a feedback associated with the final security vulnerability. The feedback optionally comprises a verification of the final security vulnerability.

According to yet another embodiment, the method comprises providing the first input on the final security vulnerability as training data to train the machine learning model and to improve an accuracy of the prediction of a presence of vulnerabilities within the source code.

According to yet another embodiment, the method comprises providing the final security vulnerability to a user on a user device. In an embodiment, the final security vulnerability is provided on the user device for notifying the final security vulnerability to the user. The final security vulnerability is optionally provided on a user interface of the user device. The user device optionally comprises a personal computer, a mobile phone, a laptop, a Smartphone or an electronic notebook.

According to yet another embodiment, the natural language processing comprises a Byte Pair Encoding (BPE). Byte pair encoding is a form of data compression in which the most common pair of consecutive bytes of data is replaced with a byte that does not occur within that data.

According to yet another embodiment, the source code comprises at least one of a method, a class, a package or variable names along with comments and string literals.

According to yet another embodiment, the library analysis is performed using a software component analysis tool.

The present disclosure also provides a system for (of) automatically detecting a security vulnerability in a source code using a machine learning model, characterized in that the system comprising:
one or more processors;
one or more non-transitory computer-readable mediums storing one or more sequences of instructions, which when executed by the one or more processors, cause:
  obtaining the source code from a client codebase, wherein the client codebase is a complete or an incomplete body of the source code for a given software program or an using a machine learning (ML) model to perform a ML based analysis on an abstract syntax tree (AST) for detecting a first security vulnerability over a static source code, the machine learning based analysis comprising:
    flattening the abstract syntax tree (AST) into a sequence of structured tokens, wherein the sequence of structured tokens comprises a semantic structure and a syntactic structure of the source code,
    implementing a natural language processing technique on the sequence of structured tokens for mapping the sequence of structured tokens to one or more integers,
    pre-training the machine learning model using an unlabeled source code as an input to predict a subsequent sub-token in the sequence of structured tokens, and
    training the machine learning model on a labeled source code to predict a presence or an absence of the first security vulnerability.

The advantages of the present system are thus identical to those disclosed above in connection with the present method and the embodiments listed above in connection with the present method apply mutatis mutandis to the present system.

In an embodiment, the system optionally comprises a server, wherein the server a processor and a memory containing a set of instructions executed by the processor to perform above-mentioned operation of automatically detecting a security vulnerability in a source code using a machine learning model. The server optionally partially performs the above steps for automatically detecting a security vulnerability in the source code using the machine learning model. The system optionally comprises more than one server that optionally performs one or more of the above steps. The server optionally comprises a server database that stores the machine learning model. The server optionally comprises a tablet, a desktop, a personal computer or an electronic notebook. In an embodiment, the server may be a cloud service.

In an embodiment, the system optionally comprises a first processor that generates the machine learning model. The system optionally comprises a second processor. The second processor optionally executes the one or more of the above steps. The system optionally comprises an input interface for receiving the source code from the client codebase. The system optionally further comprises an output interface for providing the final security vulnerability.

In an embodiment, the system is communicatively connected a user device for providing the final security vulnerability to a user. The system optionally provides a user interface on the user device to display the final security vulnerability. The user device optionally comprises a mobile phone, a personal computer, a laptop, a Smartphone or an electronic notebook. In an embodiment, the user device is communicatively connected to the system through a communication network.

In an embodiment, the machine learning comprises any one of: linear regression, neural network, decision tree, decision forest or gradient boosted decision tree, radial basis function, support vector machine, Gaussian process, or principal component analysis.

In an embodiment, the machine learning models is optionally applied to the source code in many ways. The system optionally employs a transformer based model over a neural network model for detecting a security vulnerability in the source code. In an embodiment, the machine learning comprises at least one of: a graph neural network, a neural turing machine, a tree-structured recurrent neural network, convolutional neural network, structure attention network or a dynamic computation graph model. The system optionally explores a cross-language transfer learning and intra-language, cross-vulnerability transfer learning. The transfer learning is a model trained for one task and retraining it to perform a related task with the "transferring" knowledge used to solve the first task to solve the second task.

According to an embodiment, the one or more processors is configured to provide the final security vulnerability on an expert device for receiving a first input from a security expert. In an embodiment, the expert device is communicatively connected to the system through a communication network. The system optionally provides a user interface on the expert device for receiving the first input from the security expert. The expert device optionally comprises a personal computer, a mobile phone, a laptop, a Smartphone or an electronic notebook. The communication network optionally comprises a wired network or a wireless network.

According to an embodiment, the one or more processors is configured to detect a second security vulnerability before compilation of the source code by performing a static analysis on a vectorized call graph.

According to another embodiment, the one or more processors is configured to detect a third security vulnerability during the compilation of the source code by performing a library analysis on the vectorized call graph.

According to yet another embodiment, the one or more processors is configured to perform, using the machine learning model, a post-analysis on the first security vulnerability, the second security vulnerability, and the third security vulnerability to predict a final security vulnerability.

According to yet another embodiment, the one or more processors is configured to generate a database with the source code and its associated metadata, wherein the source code comprises the unlabeled source code and the labeled source code.

According to yet another embodiment, the one or more processors is configured to parse the source code into the abstract syntax tree (AST), wherein the abstract syntax tree (AST) is a tree representation of an abstract syntactic structure of the source code written in a programming language.

According to yet another embodiment, the one or more processors is configured to generate a call graph by integrating the abstract syntax tree (AST) with a control and a dataflow of the source code, wherein the call graph represents calling relationships between subroutines in a computer program.

According to yet another embodiment, the one or more processors is configured to implement an embedded technique on the call graph to generate the vectorized call graph.

According to yet another embodiment, the one or more processors is configured to process the first input on the final security vulnerability, wherein the first input comprises a feedback associated with the final security vulnerability. In an embodiment, the first input comprises a verification of the final security vulnerability.

According to yet another embodiment, the one or more processors is configured to provide the first input on the final security vulnerability as training data to train the machine learning model and to improve an accuracy of the prediction of a presence of vulnerabilities within the source code.

The present disclosure also provides a computer program product comprising instructions to cause the system to carry out the above-described method.

The advantages of the present computer program product are thus identical to those disclosed above in connection with the present method and the embodiments listed above in connection with the present method apply mutatis mutandis to the computer program product.

Embodiments of the present disclosure beneficially improve signal-to-noise ratio through the combination of above analysis and, in particular, the through the machine learning (ML) model and assist in improving security vulnerability detection in the source code. Embodiments of the present disclosure beneficially automate the detection of a security vulnerability in the source code using a combination of static analysis and component analysis techniques (i.e. library analysis) coupled with the machine learning model. Embodiments of the present disclosure optionally enable a complete scan of a computer program to automatically identify any potential security vulnerability and classify it. Embodiments of the present disclosure optionally provide the detected security vulnerability for review or verification by a human security expert. Embodiments of the present disclosure beneficially detect security vulnerabilities at a speed comparable to a speed at which the source code is written and deployed.

DETAILED DESCRIPTION OF THE DRAWINGS

Figure 1:
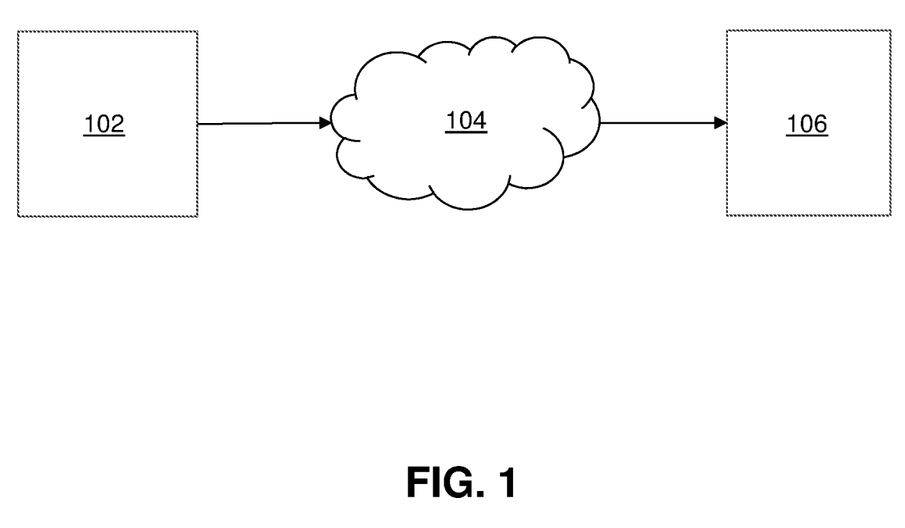
FIG. 1 is a schematic illustration of a system in communication with a client device in accordance with an embodiment of the present disclosure.

FIG. 1 is a schematic illustration of a system 102 in communication with a client device 106 in accordance with an embodiment of the present disclosure. The system 102 receives an input from the client device 106 through a network 104. The input comprises a source code from a codebase of the client device 106. The system 102 comprises one or more processors to automatically detect a security vulnerability in the source code using a machine learning model. The function of these parts as has been described above.

Figure 2:
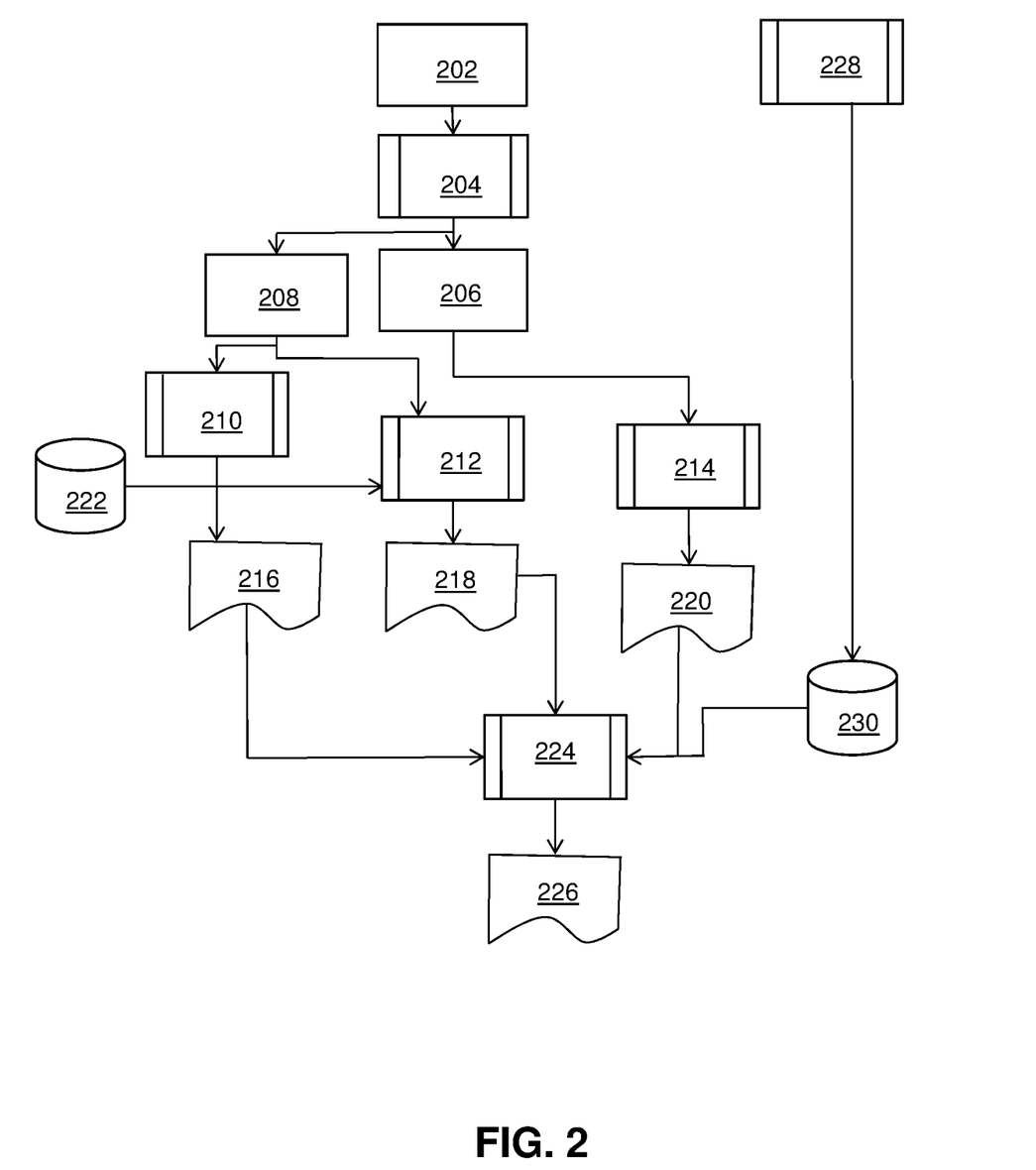
FIG. 2 illustrates an exploded view of a system for (of) automatically detecting a security vulnerability in a source code using a machine learning model in accordance with an embodiment of the present disclosure.

FIG. 2 illustrates an exploded view of a system for (of) automatically detecting a security vulnerability in a source code using a machine learning model in accordance with an embodiment of the present disclosure. The system comprises a source code module 202, an intermediate representation module 204, an abstract syntax tree (AST) module 206, a call graph generation module 208, a static analysis module 210, a library analysis module 212, a machine learning analysis module 214, a second security vulnerability determination module 216, a third security vulnerability determination module 218, a first security vulnerability determination module 220, a security vulnerability database 222, a machine learning post analysis module 224, a final vulnerability determination module 226, a live system 228 and a system telemetry 230. The source code module 202 receives the source code from a codebase of a client device. The client codebase is a complete or an incomplete body of the source code for a given software program or an application. The source code comprises an unlabeled source code and a labeled source code.

The intermediate representation module 204 segments the source code into intermediate representation of the source code. The abstract syntax tree (AST) module 206 parses the source code into an abstract syntax tree (AST). The abstract syntax tree (AST) is a tree representation of an abstract syntactic structure of the source code written in a programming language. The call graph generation module 208 generates a call graph by integrating the abstract syntax tree (AST) with a control and a dataflow of the source code. The call graph represents calling relationships between subroutines in a computer program. The call graph generation module 208 implements an embedded technique on the call graph to generate a vectorized call graph. In an embodiment, the vectorized call graph is transmitted to the static analysis module 210 and the library analysis module 212. The static analysis module 210 performs a static analysis on the vectorized call graph before compilation of the source code to detect a second security vulnerability. The library analysis module 212 performs a library analysis on the vectorized call graph during compilation of the source code to detect a third security vulnerability. The second security vulnerability determination module 216 predicts the second security vulnerability based on the static analysis. The third security vulnerability determination module 218 determines the third security vulnerability based on the library analysis. The abstract syntax tree (AST) is transmitted to the machine learning analysis module 214. The machine learning analysis module 214 performs a machine learning model based analysis on the abstract syntax tree (AST) over the static source code to detect a first security vulnerability. The first security vulnerability determination module 220 determines the first security vulnerability based on the machine learning model based analysis. The security vulnerability database 222 stores the first security vulnerability, the second security vulnerability, and the third security vulnerability. The machine learning analysis module 214 flattens the abstract syntax tree (AST) into a sequence of structured tokens. The sequence of structured tokens comprises a semantic structure and a syntactic structure of the source code. The machine learning analysis module 214 implements a natural language processing technique on the sequence of structured tokens for mapping the sequence of structured tokens to one or more integers. The machine learning model is pre-trained using the unlabeled source code as an input to predict a subsequent sub-token in the sequence of structured tokens. The machine learning model is also trained on the labeled source code to predict a presence or an absence of a specific security vulnerability. The machine learning post analysis module 224 performs a post-analysis on the first security vulnerability, the second security vulnerability, and the third security vulnerability to predict a final security vulnerability. The final vulnerability determination module 226 predicts the final security vulnerability based on the machine learning based post analysis. The live system 228 is connected to the system telemetry 230. The system telemetry 230 is connected to the machine learning post analysis module 224.

Figure 3:
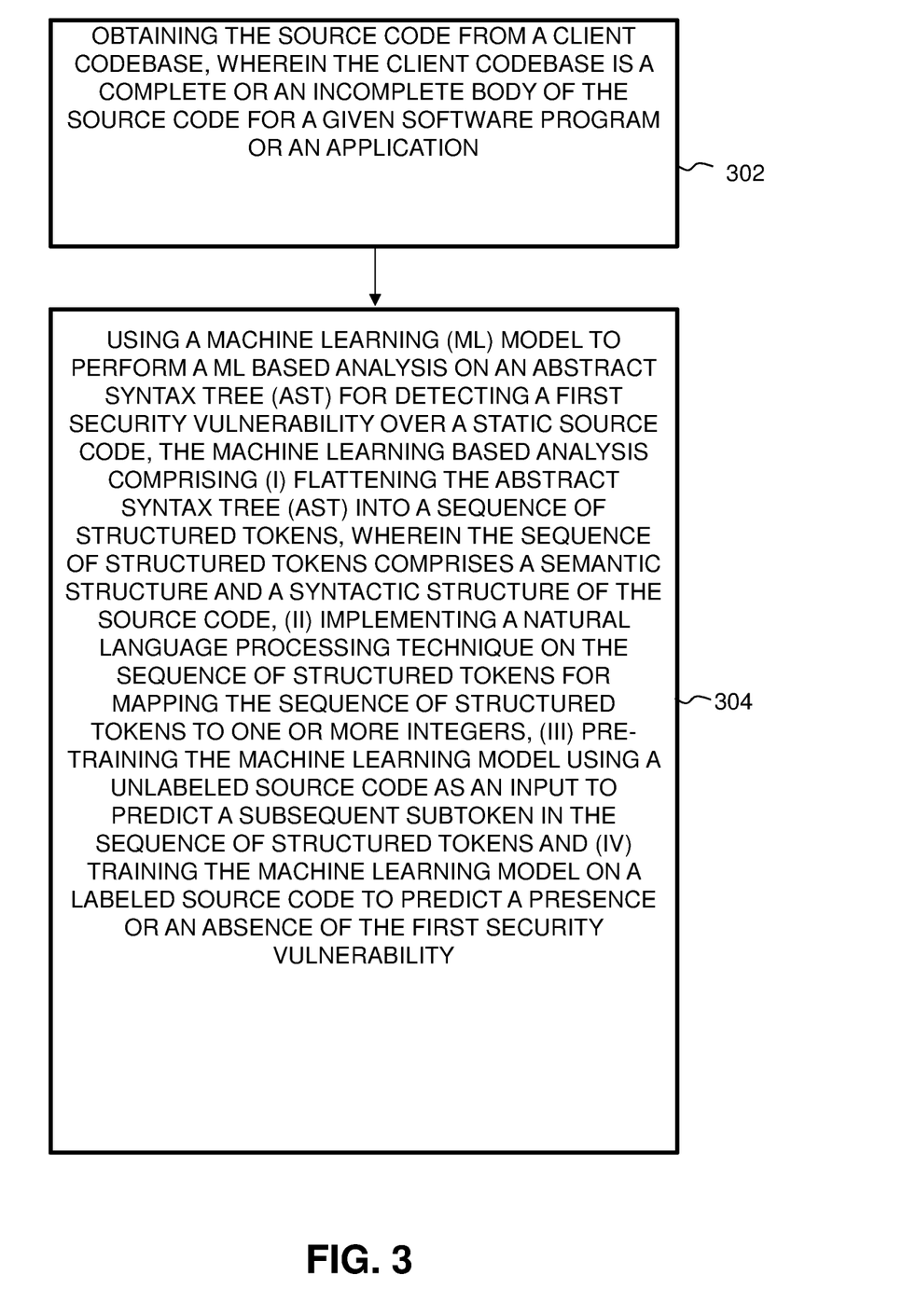
FIG. 3 is a schematic illustration of a method for (of) automatically detecting a security vulnerability in a source code using a machine learning model in accordance with an embodiment of the present disclosure.

FIG. 3 is a schematic illustration of a method for (of) automatically detecting a security vulnerability in a source code using a machine learning model in accordance with an embodiment of the present disclosure. At a step 302, the source code is obtained from a client codebase. The client codebase is a complete or an incomplete body of the source code for a given software program or an application. At a step 304, a machine learning (ML) based analysis is performed on an abstract syntax tree (AST) for detecting a first security vulnerability over a static source code. The ML based analysis comprises (i) flattening the abstract syntax tree (AST) into a sequence of structured tokens, wherein the sequence of structured tokens comprises a semantic structure and a syntactic structure of the source code, (ii) implementing a natural language processing technique on the sequence of structured tokens for mapping the sequence of structured tokens to one or more integers, (iii) pre-training the machine learning model using an unlabeled source code as an input to predict a subsequent sub-token in the sequence of structured tokens and (iv) training the machine learning model on a labeled source code to predict a presence or an absence of the first security vulnerability.

Figure 4:
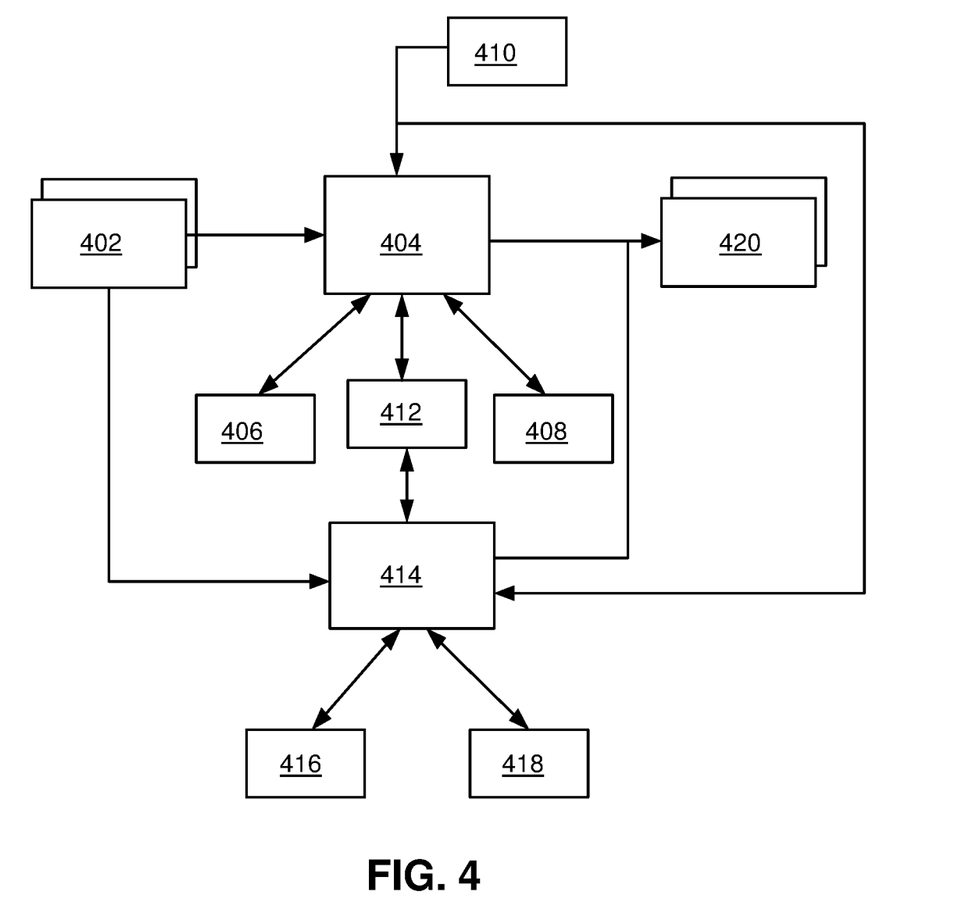
FIG. 4 is an illustration of an exploded view of a distributed computing system or cloud computing implementation in accordance with an embodiment of the present disclosure.

FIG. 4 is an illustration of an exploded view of a distributed computing system or cloud computing implementation in accordance with an embodiment of the present disclosure. The exploded view comprises an input interface 402, a control module that comprises a processor 404, a memory 406 and a non-volatile storage 408, processing instructions 410, a shared/distributed storage 412, a server that comprises a server processor 414, a server memory 416 and a server non-volatile storage 418 and an output interface 420. The function of the server processor 414, the server memory 416 and the server non-volatile storage 418 are thus identical to the processor 404, the memory 406 and the non-volatile storage 408 respectively. The functions of other parts are as has been known in the art.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for (of) automatically detecting a security vulnerability in a source code using a machine learning model, wherein the method comprises:
    obtaining the source code from a client codebase, wherein the client codebase is a complete or an incomplete body of the source code for a given software program or an application; and
    parsing the source code into an abstract syntax tree (AST);
    using a machine learning (ML) model to perform a ML based analysis on the abstract syntax tree (AST) for detecting a first security vulnerability over a static source code, the machine learning based analysis comprising:
        flattening the abstract syntax tree (AST) into a sequence of structured tokens, wherein the sequence of structured tokens comprises a semantic structure and a syntactic structure of the source code,
        implementing a natural language processing technique on the sequence of structured tokens for mapping the sequence of structured tokens to one or more integers, wherein the natural language processing comprises Byte Pair Encoding (BPE);
        pre-training the machine learning model using an unlabeled source code as an input to predict a subsequent sub-token in the sequence of structured tokens, and
        training the machine learning model on a labeled source code to predict a presence or an absence of the first security vulnerability.

2. A method according to claim 1, wherein the method comprises detecting a second security vulnerability before compilation of the source code by performing a static analysis on a vectorized call graph.

3. A method according to claim 2, wherein the method comprises detecting a third security vulnerability during the compilation of the source code by performing a library analysis on the vectorized call graph.

4. A method according to claim 3, wherein the method comprises performing, using the machine learning model, a post-analysis on the first security vulnerability, the second security vulnerability, and the third security vulnerability to predict a final security vulnerability.

5. A method according to claim 4, wherein the method comprises providing the final security vulnerability on an expert device for receiving a first input from a security expert.

6. A method according to claim 5, wherein the method comprises processing the first input on the final security vulnerability, wherein the first input comprises a feedback associated with the final security vulnerability.

7. A method according to claim 5, wherein the method comprises providing the first input on the final security vulnerability as training data to train the machine learning model and to improve an accuracy of the prediction of a presence of security vulnerabilities within the source code.

8. A method according to claim 4, wherein the method comprises providing the final security vulnerability to a user on a user device.

9. A method according to claim 3, wherein the method comprises generating a call graph by integrating the abstract syntax tree (AST) with a control and a dataflow of the source code, wherein the call graph represents calling relationships between subroutines in a computer program.

10. A method according to claim 9, wherein the method comprises implementing an embedded technique on the call graph to generate the vectorized call graph.

11. A method according to claim 3, wherein the library analysis is performed using a software component analysis tool.

12. A method according to claim 1, wherein the method comprises generating a database with the source code and its associated metadata, wherein the source code comprises the unlabeled source code and the labeled source code.

13. A method according to claim 1, wherein the abstract syntax tree (AST) is a tree representation of an abstract syntactic structure of the source code written in a programming language.

14. A method according to claim 1, wherein the source code comprises at least one of a method, a class, a package or variable names along with comments and string literals.

15. A computer program product comprising instructions to cause the system to carry out the method of claim 1.

16. A method according to claim 1, wherein the method comprises:
developing an intelligent static analysis tool using natural language aspects of the source code; and
analyzing and learning an statistical model of the natural aspects of the source code enabling the machine learning model to generalize to patterns and APIs not seen during training or not known/built-in to a static analysis tool.

17. A system for (of) automatically detecting a security vulnerability in a source code using a machine learning model, wherein the system comprises:
one or more processors;
one or more non-transitory computer-readable mediums storing one or more sequences of instructions, which when executed by the one or more processors, cause:
obtaining the source code from a client codebase, wherein the client codebase is a complete or an incomplete body of the source code for a given software program or an application; and
using, a machine learning (ML) model to perform a ML based analysis on an abstract syntax tree (AST) for detecting a first security vulnerability over a static source code, the machine learning based analysis comprising:
flattening the abstract syntax tree (AST) into a sequence of structured tokens, wherein the sequence of structured tokens comprises a semantic structure and a syntactic structure of the source code,
implementing a natural language processing technique on the sequence of structured tokens for mapping the sequence of structured tokens to one or more integers, wherein the natural language processing comprises a Byte Pair Encoding (BPE); and,
pre-training the machine learning model using an unlabeled source code as an input to predict a subsequent sub-token in the sequence of structured tokens, and training the machine learning model on a labeled source code to predict a presence or an absence of the first security vulnerability.

18. A system according to claim 17, wherein the one or more processors is configured to detect a second security vulnerability before compilation of the source code by performing a static analysis on a vectorized call graph.

19. A system according to claim 18, wherein the one or more processors is configured to detect a third security vulnerability during the compilation of the source code by performing a library analysis on the vectorized call graph.

20. A system according to claim 19, wherein the one or more processors is configured to perform, using the machine learning model, a post-analysis on the first security vulnerability, the second security vulnerability, and the third security vulnerability to predict a final security vulnerability.

21. A system according to claim 20, wherein the one or more processors is configured to provide the final security vulnerability on an expert device for receiving a first input from a security expert.

22. A system according to claim 21, wherein the one or more processors is configured to process the first input on the final security vulnerability, wherein the first input comprises a feedback associated with the final security vulnerability.

23. A system according to claim 21, wherein the one or more processors is configured to provide the first input on the final security vulnerability as training data to train the machine learning model and to improve an accuracy of the prediction of a presence of vulnerabilities within the source code.

24. A system according to claim 19, wherein the one or more processors is configured to generate a call graph by integrating the abstract syntax tree (AST) with a control and a dataflow of the source code, wherein the call graph represents calling relationships between subroutines in a computer program.

25. A system according to claim 24, wherein the one or more processors is configured to implement an embedded technique on the call graph to generate the vectorized call graph.

26. A system according to claim 17, wherein the one or more processors is configured to generate a database with the source code and its associated metadata, wherein the source code comprises the unlabeled source code and the labeled source code.

27. A system according to claim 17, wherein the abstract syntax tree (AST) is a tree representation of an abstract syntactic structure of the source code written in a programming language.

28. A system according to claim 17, wherein the one or more processors is configured to develop an intelligent static analysis tool using natural language aspects of the source code and analyze and learn an statistical model of the natural aspects of the source code enabling the machine learning model to generalize to patterns and APIs not seen during training or not known/built-in to a static analysis tool.

\* \* \* \* \*